Feb. 16, 1932.  H. C. WELLMAN  1,845,462
MOTION PICTURE PROJECTOR
Filed June 21, 1927   2 Sheets-Sheet 1
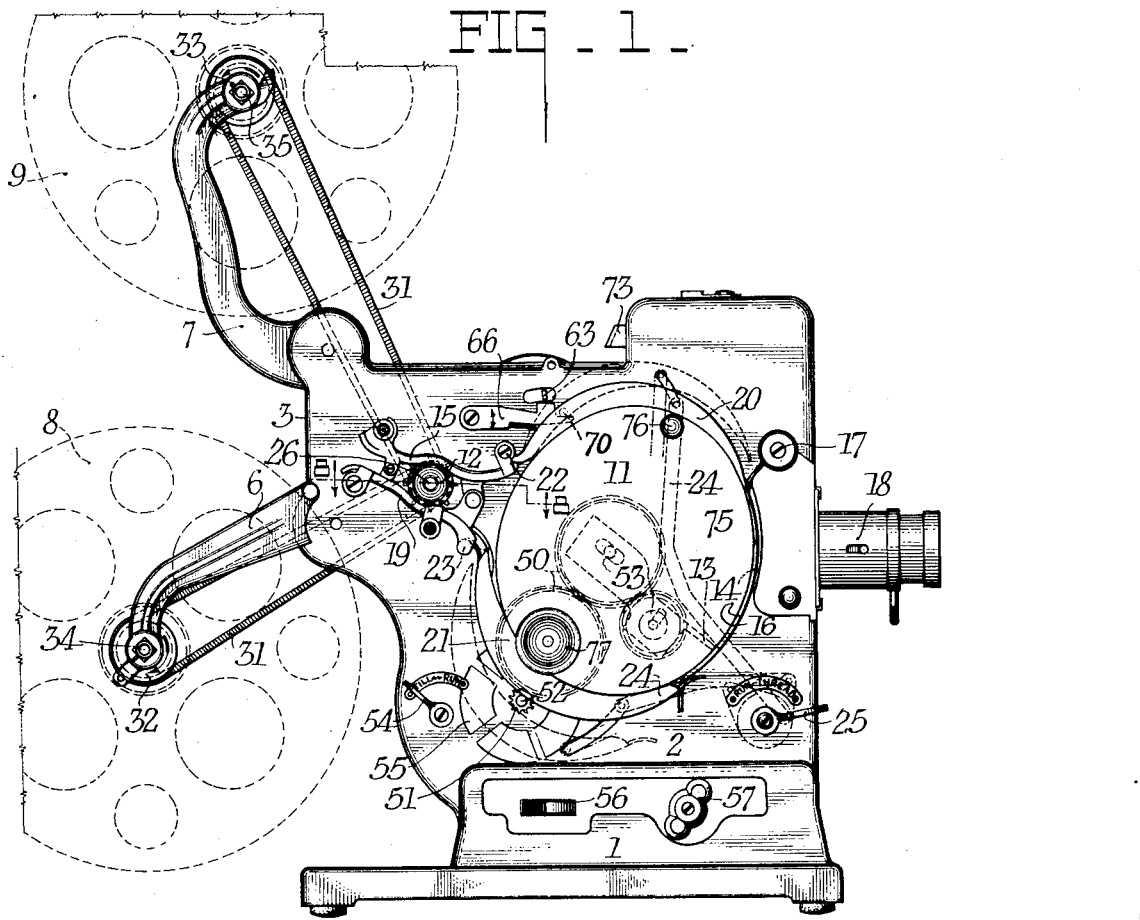
FIG _ 1 _
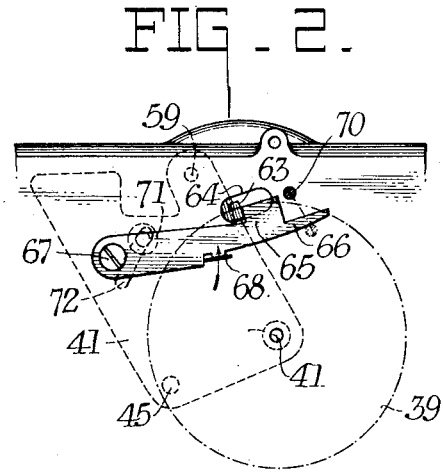
FIG _ 2 _
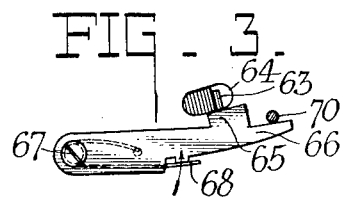
FIG _ 3 _
INVENTOR,
Howard C. Wellman,
BY
ATTORNEYS.

Feb. 16, 1932. H. C. WELLMAN 1,845,462
MOTION PICTURE PROJECTOR
Filed June 21, 1927  2 Sheets-Sheet 2
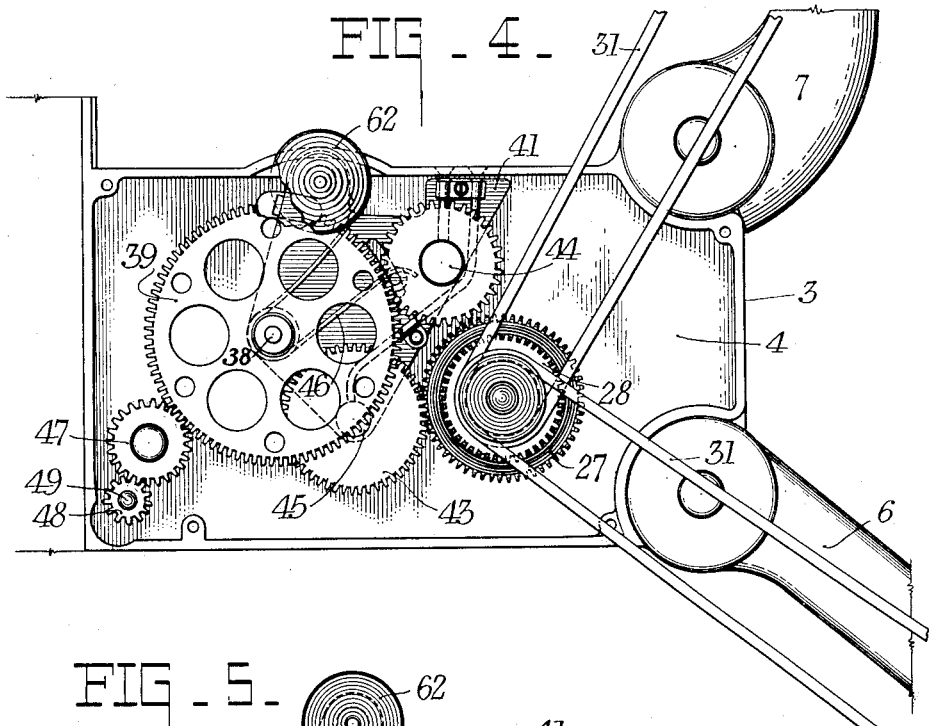
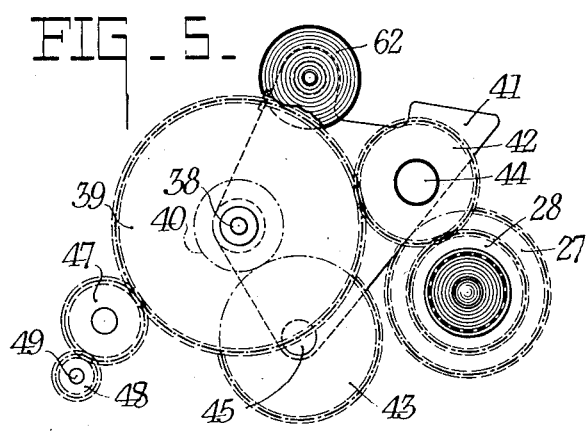
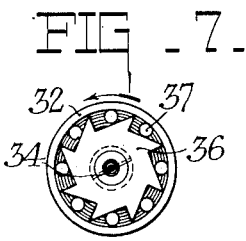
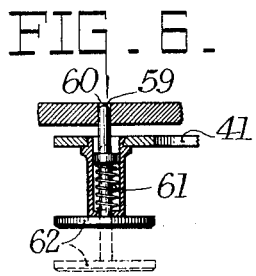
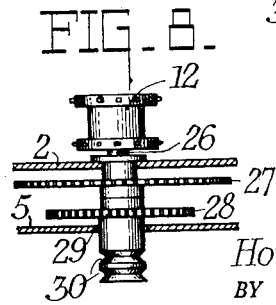
INVENTOR,
Howard C. Wellman,
BY
ATTORNEYS.

Patented Feb. 16, 1932

1,845,462

UNITED STATES PATENT OFFICE

HOWARD C. WELLMAN, OF ROCHESTER, NEW YORK, ASSIGNOR TO EASTMAN KODAK COMPANY, OF ROCHESTER, NEW YORK, A CORPORATION OF NEW YORK

MOTION-PICTURE PROJECTOR

Application filed June 21, 1927. Serial No. 200,454.

This application relates to improvements in motion picture projectors and particularly to structures permitting of the passing of the film therethrough in either direction for projection purposes, provision being made for the rewinding of the film after projection upon either reel at an increased speed. Provision is further made for the automatic threading of the film through the projector, the devices for this purpose being so connected to the high speed rewinding mechanism that the latter is necessarily rendered inoperative when the automatic threading structure is in its operative position.

Further objects and advantages of my invention will appear from the following description, it being understood that this is merely an example illustrative of a preferred embodiment thereof. Reference will be made to the accompanying drawings, in several figures of which the same reference characters refer to the same parts, and in which, Fig. 1 is a side view of said preferred embodiment.

Figs. 2 and 3 are fragmentary views illustrating the structure and operation of a latch mechanism.

Fig. 4 is a view from the rear of Fig. 1 showing certain parts only, including particularly the drive gearing.

Fig. 5 is a diagrammatic view showing certain gear parts in a second position.

Fig. 6 is a section on line 6—6 of Fig. 4.

Fig. 7 shows a detail of a clutch on a reel shaft.

Fig. 8 is a section on line 8—8 of Fig. 1.

I have chosen to illustrate my invention as applied to a motion picture projector of a type disclosed in Patent No. 1,745,874, issued February 4, 1930, to Stuber and Underwood. This projector comprises a rigid base 1 having a longitudinal main wall 2, having laterally extending flanges 3 enclosing a space 4 which may be closed by a removable plate 5, this being removed in Fig. 4, but a fragment thereof being shown in Fig. 8. On the rear of this wall are pivoted arms 6 and 7 supporting reels 8 and 9 respectively.

The wall 2 carries a casing 11 on one side, about which the film is adapted to pass in a loop, being propelled continuously from one reel to the other by sprocket 12, and being intermittently advanced by claw 13 past the gate portion 14 of the casing, the latter containing the claw and other mechanism. The film is pressed against the gate portion 14 by an arcuate presser member 16 pivoted at 17. At 18 is shown the usual objective.

Guide members 15 and 19 are provided above and below sprocket 12, and these connect with the loop-forming guides 20 and 21, pivoted at 22 and 23 respectively, about which they may be swung between the positions shown in full and dotted lines by the lever mechanism 24, shown in dotted lines and operated by handle 25, and more fully described in my Patent 1,694,110, granted Dec. 4, 1928. These guides cooperate with the presser member 16 in the manner fully described in said Stuber and Underwood application to thread the film automatically when an end thereof is introduced between guide 15 and the film propelling sprocket 12. With the guides 20 and 21 in the position shown in full lines, the film will automatically pass around the casing within the guides and beneath the gate and out between sprocket 12 and guide 19, whereupon it may be wound on reel 8. When the film is running satisfactorily the guides are moved to dotted line positions. The presser 16 is shown in one position only as its movement is not material to the present invention.

The shaft 26 of sprocket 12 is journalled in wall 2, on the opposite side of which it carries two gear wheels 27 and 28 of different sizes. Beyond gear 28, an enlarged extension 29 passes through plate 5, and has, beyond said plate, pulley grooves 30 about which engage coil spring friction belts 31 extending to pulleys 32 and 33 on shafts 34 and 35 carried by arms 6 and 7, these being the shafts for the reels 8 and 9. These pulleys are not rigid on the shafts but are connected thereto by overrunning or slip, one-way clutches of a familiar type, one of which is shown in a formal way in Fig. 7. The particular clutch chosen for illustration comprises a ratchet wheel 36 keyed to shaft 34 or 35. A rim of pulley 32 or 33 surrounds the ratchet and in each of the spaces thus formed is a ball 37. When the pulley of Fig. 7 is turned in the direction indicated, it will run free, but when turned in the reverse directions, the balls will bind and the shaft will be turned. Since these are applied to shafts 34 and 35 and their respective pulleys 32 and 33 in reverse directions, as indicated by arrows in Fig. 1, so as to be alternatively operative, it follows that, when the sprocket shaft 26 is turned in one direction, one reel will turn and the other run free and vice versa.

The sprocket shaft 26 may be driven by either of alternatively operative gear trains, gear 27 being a part of one train and 28 a part of the other, both gear trains being driven from shaft 38, which carries two gears 39 and 40 of different sizes, the large gear 39 being in alignment with gear 28 and the small gear 40 with gear 27. Pivoted on shaft 38 is a plate 41 carrying gears 42 and 43 of different sizes on stub shafts 44 and 45 respectively, gear 42 meshing with gear 39 and gear 43 meshing with gear 40. This plate 41 may be swung about shaft 38 between an upper position shown in Fig. 4 and a lower position shown in Fig. 5. In the upper position, gear 43 will intermesh with gear 27 and complete one gear train, and in the lower position gear 42 will intermesh with gear 28 and complete the alternative gear train. A spring 46 urges the plate toward its upper or normal position, in which the gear train 40, 43, 27 is operative to propel the film at a normal rate through the projector and upon one or the other of the reels. When the plate 41 is moved to the lower position, the train 39, 42, 28 operates to drive the parts at a much higher rate of speed, the particular ratio being dependent on the proportions of the gears and being comparatively immaterial.

Shaft 38 is driven through gear 39 from gears 47 and 48, the latter being mounted on a shaft 49 extending through wall 2 and driven by a train of gears 50 from a pinion 51 on motor shaft 52. The details of gear train 50 and of the mechanism 53 that operates claw 13 are not shown or described fully, but are merely indicated, these details not constituting a part of the present invention. In Fig. 1 are shown a control 54 for unclutching the mechanism to project stills, ventilating openings 55, a switch 56 controlling the electric circuit to the entire machine, and a switch 57 controlling the direction of turning the motor.

Plate 41 is held in its normal or upper position, not only by spring 46 but also by a latch, a section of which is shown in Fig. 6. This comprises a pin 59 adapted to engage a hole 60 in frame 2 and pressed into engagement therewith by spring 61. A button 62 is provided by which it may be withdrawn, permitting the turning of the plate. The pin 59 then slides along the surface of frame 2 and has no other latching position.

A second latch is provided for holding the plate in its lower position. This consists of a projection 63 on plate 41 extending through a slot 64 in plate 2 into the path of an abutment 65 carried by a latch member 66 pivoted at 67 and pressed upwardly by spring 68. When the plate 41 is moved to the left (Figs. 1 to 3) the projection 63 will ride along abutment 65 in the position of Figs. 1 and 3 until the plate reaches its second position, completing gear train 39, 42, 28 whereupon the projection will reach the position of Fig. 2, and the latch member 66 will swing in the direction of the arrow and hold the plate in this position.

The guide member 20 carries a pin 70 having a path of movement indicated in Fig. 2. When the member 20 is close to casing 11, and operative to guide the lead end of a film strip through the projector, this pin will have the position shown in Figs. 1 and 3 and in Fig. 2 in dotted lines. When it is in its outer position, the pin will occupy the position shown in full lines in Fig. 2. When it is in the latter position, the latch is free to operate in the manner just described, and when it is in its operative position, the latch is held from operating. Movement of the guide member 20 to operative position, shown in full lines in Fig. 1 will retract the latch 66, permitting 63 to slip and the plate 41 will resume its normal position. A headed pin 71 on frame 2 engages a slot 72 in plate 41, guiding and holding the latter.

It is to be noted that the reel supporting arms 6 and 7 are foldable and that arm 7 is so shaped that, when folded and engaged by a suitable latch 73, it constitutes a handle by which the projector may be carried. The cover 75 of casing 11 is held in place by a latch 76, and 77 indicates a thumb piece by which the mechanism may be adjusted as is sometimes necessary in projecting stills.

In the usual operation of the projector, a full reel 9 of film will be placed on shaft 35, the guides 20 and 21 and presser 16 will be moved by control 25 to the position in which they are operative to guide and thread the film, the guides 20 and 21 being adjacent casing 11. The lead end of the film will be presented between film propelling sprocket 12 and guide 15 and the mechanism started by switch 56. The film will be automatically guided and threaded through the machine, emerging between sprocket 12 and guide 19, and will be attached by hand to reel 8. The control 25 will be turned to remove the guides from automatic threading position, and the film will be projected at normal speed. The operator can, at any time, reverse the direction of movement by switch 57, or stop it by control 54 to project a still. When all the film has been projected, he will attach the outer end from reel 8 directly to reel 9 and will, by operating button 62, move the plate 41 with the gears carried thereby to its alternative position where it is held by latch 66. The film will then be rewound at high speed on reel 9. When it is entirely rewound the reel will be removed, and another substituted, the handle 25 operated to move the guides to threading position, thereby releasing and rendering inoperative the high speed rewind. It is obvious since each reel may be driven at either speed, that either reel shaft can be used for the supply or take-up reel, or for rewinding.

It is to be understood that the described structure is by way of example and that I consider as included in my invention all such modifications and equivalents as fall within the scope of the appended claims.

Having thus described my invention, what I claim as new and desire to secure by Letters Patent is:

1. In a motion picture apparatus, two reel supports, a power shaft, means for propelling a film through the apparatus, driving connections from the power shaft to both reel supports, the driving connections from the power shaft to at least one reel support including alternatively operative driving systems producing different speed ratios between the said driven reel support and the power shaft.

2. In a motion picture apparatus, two reel supports, a power shaft, means for propelling a film through the apparatus, driving connections from the power shaft to both reel supports, the driving connections including alternatively operative driving elements producing different positive speed ratios between each of the said driven reel supports and the power shaft.

3. In a motion picture apparatus, two reel supports, a power shaft, means for propelling a film through the apparatus, driving connections from the power shaft to both reel supports, the driving connections from the power shaft to at least one reel support including alternatively operative driving systems producing different speed ratios between the said driven reel support and the power shaft, and means rendering one of said systems normally and automatically operative.

4. In a motion picture apparatus, two rotary reel supports, a power shaft, means for propelling a film through the apparatus from a reel on one support to a reel on the other support, driving connections from the power shaft to the said means and to both reel supports and including alternatively operative driving systems producing different positive speed ratios between each of the said driven members and the power shaft.

5. In a motion picture projector, two reel shafts, a power shaft, means for advancing film through the projector from a reel on one shaft to a reel on the other shaft, driving connections from the power shaft to the means and to both reel shafts whereby film may be advanced from a reel on either shaft through the means to a reel on the other shaft, the driving connections from the power shaft to both reel shafts including alternatively operative driving elements producing different positive speed ratios between each of the driven reel supports and the power shaft.

6. In a motion picture projector, two reel supports, a power shaft, means for advancing film through the projector, driving connections from the power shaft to the means and to both reel supports, the driving connections to the two reel supports including, respectively, alternatively operative power transmitting elements, the driving connection to at least one reel support including other alternatively operative driving elements producing different speed ratios between the said reel support and the power shaft.

7. In a motion picture projector, two reel shafts, a power shaft, means for advancing film through the projector in either direction, driving connections from the power shaft to the said means and to both reel supports, each of the driving connections to the two reel supports including, respectively, alternatively operative power transmitting elements, the driving connections to both reel supports including in common alternatively operative driving elements producing different positive speed ratios between the said reel support and the power shaft.

8. In a motion picture projector, two reel supports, a power shaft, means for propelling a film through the projector, driving connections from the power shaft to both reel supports, said driving connections including alternatively operative gear trains producing different positive speed ratios between the power shaft and each of the reel supports.

9. In a motion picture projector, two reel supports, a power shaft, means for propelling a film through the projector, driving connections from the power shaft to both reel supports, said driving connections including two fixed shafts, two gears on each shaft, and a movable plate carrying two gears and having two positions in one of which one gear carried thereby will engage one gear on each of the two fixed shafts and in the other of which the other gear carried thereby will engage the other gears on the fixed shafts, the gear trains thus formed producing different speed ratios between the said shafts.

10. In a motion picture projector, two reel supports, a power shaft, means for propelling a film through the projector, driving connections from the power shaft to both real supports, said driving connections including two fixed shafts, two gears on each shaft, and a movable plate carrying two gears and having two positions in one of which one gear carried thereby will engage one gear on each of the two fixed shafts and in the other of which the other gear carried thereby will engage the other gears on the fixed shafts, the gear trains thus formed producing different speed ratios between the said shafts and further including separate connections from said driven shaft to each of said reel supports, said separate connections including, respectively, alternatively operative driving elements.

11. In a motion picture projector, two reel supports, a power shaft, means for propelling a film through the projector, driving connections from the power shaft to both reel supports, said driving connections including two fixed shafts, two gears on each shaft, and a movable plate carrying two gears and having two positions in one of which one gear carried thereby will engage one gear on each of the two fixed shafts and in the other of which the other gear carried thereby will engage the other gears on the fixed shafts, the gear trains thus formed producing different speed ratios between the said two fixed shafts, said plate being spring pressed toward that position in which a lower speed ratio is produced, and a latch for holding the plate in that position in which the higher speed ratio is produced.

12. In a motion picture projector, a supply reel shaft, a take-up reel shaft, a power shaft, driving connections from the power shaft to both the other shafts, the driving connections between the power shaft and the supply reel shaft including two fixed, driven, rotating members having different peripheral speeds, and including also a driven shaft and a movable element controlling the completion of a driving connection to said last named shaft from either of the said members.

13. In a motion picture projector, a supply reel shaft, a take-up reel shaft, a power shaft, driving connections from the power shaft to both the other shafts, the driving connections between the power shaft and the supply reel shaft including two fixed, driven, rotating members having different peripheral speeds, and including also a driven shaft and a movable mechanical device for completing a driving connection to said last named shaft from either of the said members, said device being normally spring pressed into that position which renders effective the rotating member having the lower peripheral speed.

14. In a motion picture projector, a supply reel shaft, a take-up reel shaft, a power shaft, driving connections from the power shaft to both the other shafts, the driving connections between the power shaft and the supply reel shaft including two fixed, driven, rotating members having different peripheral speeds, and including also a driven shaft and a movable mechanical device for completing a driving connection to said last named shaft from either of the said members, and including also a clutch operative to turn the supply reel shaft only when the power shaft turns in one direction, the driving connections to the take-up reel shaft including a clutch operative to turn the take-up reel shaft only when the power shaft turns in the reverse direction.

15. In a self threading motion picture projector of the type in which film is automatically threaded in endwise direction, a movable device having a position in which it is operative to guide the lead end of a film as it is being automatically propelled and threaded in an endwise direction through said projector, two reel shafts, means for propelling a film through the projector from one reel shaft to the other at a lower rate of speed, means for rewinding film on a reel on one of the reel shafts at a higher rate of speed, and connections between the device and the rewinding means automatically rendering the latter inoperative when the device is moved to its operative position.

16. In a motion picture projector, a reel shaft, a power shaft, driving connections between the power shaft and the reel shaft and including two alternatively operative gear trains producing different speed ratios between the two shafts, means for rendering one of said gear trains normally and automatically operative and a latch for maintaining the other of said gear trains operative, a movable device having a position in which it is operative to direct the lead end of a film through a part of the projector, and having a path of movement across the latch whereby it may operate the latch and thereby render the second gear train inoperative.

17. In a motion picture apparatus, two reel supports, means for propelling film through the apparatus from one reel support to the other, a guiding device movable between two positions in one of which it is operative to direct a film through a part of the apparatus, a power shaft, driving connections from said power shaft to said propelling means and to said reel supports and including alternatively operative driving elements producing different speed ratios between the driven elements and the power shaft, and a connection between the guiding device and the driving connections automatically operative, upon movement of the guiding means to guiding position, to render the driving connections operative at a single predetermined speed ratio.

18. In a motion picture apparatus, two reel supports, means for propelling film through the apparatus from one reel support to the other, a guiding device movable between two positions in one of which it is operative to direct a film through a part of the apparatus, a power shaft, driving connections from said power shaft to said propelling means and to said reel supports and including alternatively operative driving elements producing different speed ratios between the driven elements and the power shaft, and a connection between the guiding device and the driving connections automatically operative, upon movement of the guiding means to guiding position, to render the driving connections inoperative at their highest speed ratio.

19. In a self threading motion picture apparatus, a supply reel support, a power shaft, means for propelling a film through the apparatus, a normal driving connection normally operative between the power shaft and the propelling means whereby film may be propelled at a definite, normal speed, a second driving connection, alternative to the first-named normal driving connection, between the power shaft and the supply reel support and operative to turn said support and wind film thereon at a much higher rate of speed than the said normal speed, a device movable between two positions, in one of which it is operative to direct the lead end of a film through the projector, and connections between said device and said driving connections whereby the second driving connection is automatically rendered inoperative and the normal driving connection is rendered operative upon movement of the device to its operative directing position.

20. In a motion picture projector, a movable device having two positions in one of which it is operative to guide the lead end of a film through the projector, means for propelling a film through the projector, a reel shaft, a power shaft, driving connections from said power shaft to said reel shaft and to said propelling means, a shiftable support carrying a part of said driving connections and having two positions, in one of which a part carried thereby completes a driving connection to the film propelling means to advance it at a definite speed, and in the other of which a part carried thereby completes a driving connection to the reel shaft to drive it at a much higher rate of speed, and a connection between the movable device and the shiftable support to control the position of the latter.

21. In a motion picture projector, a movable device having two positions in one of which it is operative to guide the lead end of a film through the projector, means for propelling a film through the projector, a reel shaft, a power shaft, driving connections from said power shaft to said reel shaft and to said propelling means, a shiftable support carrying a part of said driving connections and having two positions, in one of which a part carried thereby completes a driving connection to the film propelling means to advance it at a definite speed, and in the other of which a part carried thereby completes a driving connection to the reel shaft to drive it at a much higher rate of speed, said shiftable support being spring pressed toward said first position, a latch to hold said support in the second position, and a part on the movable device having a path of movement across said latch whereby the latch may be operated to release the support from its second position.

22. In a motion picture projector, two reel supports, a power shaft, means for propelling a film through the projector, driving connections from the power shaft to both reel supports, said driving connections including two fixed shafts, two gears on each shaft, and a movable plate carrying two gears and having two positions in one of which one gear carried thereby will engage one gear on each of the two fixed shafts and in the other of which the other gear carried thereby will engage the other gears on the fixed shafts, the gear trains thus formed producing different speed ratios between the said shafts, said plate being spring pressed toward that position in which a lower speed ratio is produced, and a latch for holding the plate in that position in which the higher speed ratio is produced, a movable device having a position in which it is operative to direct the lead end of a film through the projector, and having a path of movement across said latch whereby said latch may be operated to release the plate from its second position.

23. In a self-threading motion picture projector of a type adapted for endwise automatic threading of the film, a film supply means, a movable device having a position in which it is operative to guide and direct the lead end of a film as it is being automatically propelled and threaded in an endwise direction through the projector in one direction from said supply means, a mechanism adapted solely for rewinding film on said supply means and connections between the device and said mechanism automatically rendering the mechanism for rewinding film inoperative when the movable device is moved to its operative position to guide a film through the projector.

Signed at Rochester, New York, this 16th day of June, 1927.

HOWARD C. WELLMAN.